United States Patent [19]

Dupont et al.

[11] 3,972,314
[45] Aug. 3, 1976

[54] FUEL INJECTION SYSTEM

[75] Inventors: Roger Dupont, La Varenne St. Hilaire, France; Konrad Eckert, Stuttgart-Feuerbach, Germany; Heinrich Knapp, Leonberg-Silberberg, Germany; Wolf Wessel, Schwieberdingen, Germany

[73] Assignee: Robert Bosch G.m.b.H., Stuttgart, Germany

[22] Filed: Oct. 3, 1974

[21] Appl. No.: 511,357

[30] Foreign Application Priority Data
Oct. 3, 1973 Germany............................ 2349669

[52] U.S. Cl...................... 123/139 AW; 123/140 J
[51] Int. Cl.² ......................................... F02M 39/00
[58] Field of Search ..... 123/139 AW, 140 J, 119 R, 123/122 D

[56] References Cited
UNITED STATES PATENTS

| | | | |
|---|---|---|---|
| 2,927,568 | 3/1960 | Sagady | 123/139 AW |
| 3,145,699 | 8/1964 | High | 123/139 AW |
| 3,288,445 | 11/1966 | Mennesson | 123/139 AW |
| 3,461,850 | 8/1969 | Oblander | 123/139 AW |
| 3,656,464 | 4/1972 | Hilborn | 123/139 AW |
| 3,721,430 | 3/1973 | Landrum | 123/122 D |
| 3,777,727 | 12/1973 | Kirchner | 123/139 AW |
| 3,823,696 | 7/1974 | Mutschler | 123/139 AW |

FOREIGN PATENTS OR APPLICATIONS 900,386   7/1962   United Kingdom......... 123/139 AW

*Primary Examiner*—Charles J. Myhre
*Assistant Examiner*—R. H. Lazarus
*Attorney, Agent, or Firm*—Edwin E. Greigg

[57] ABSTRACT

A fuel injection system for externally ignited internal combustion engines preferably has one fuel injection location in the air induction tube (manifold). The metering of fuel occurs independently of the condition of the air prevailing at the injection location, the injection location is disposed ahead of the junction of the air induction tube which leads to the individual engine cylinders. Air is brought to a high velocity by means within the induction tube and impinges, at this high velocity, immediately on the injected fuel, enveloping the same. As a result, the mixture preparation is effected without wetting of the inner wall of the induction tube and the means which bring the air to the required high velocity.

29 Claims, 7 Drawing Figures

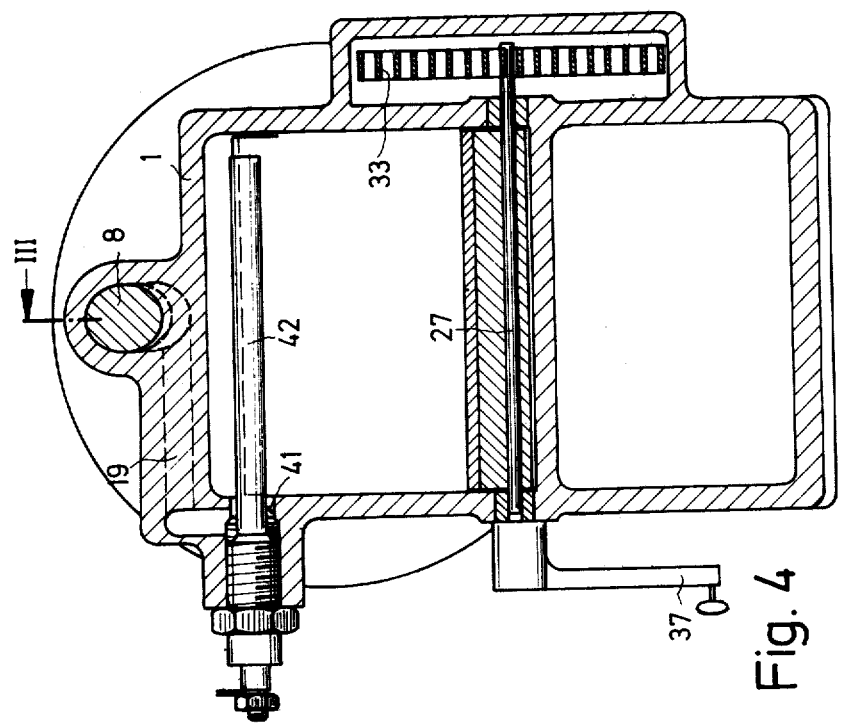
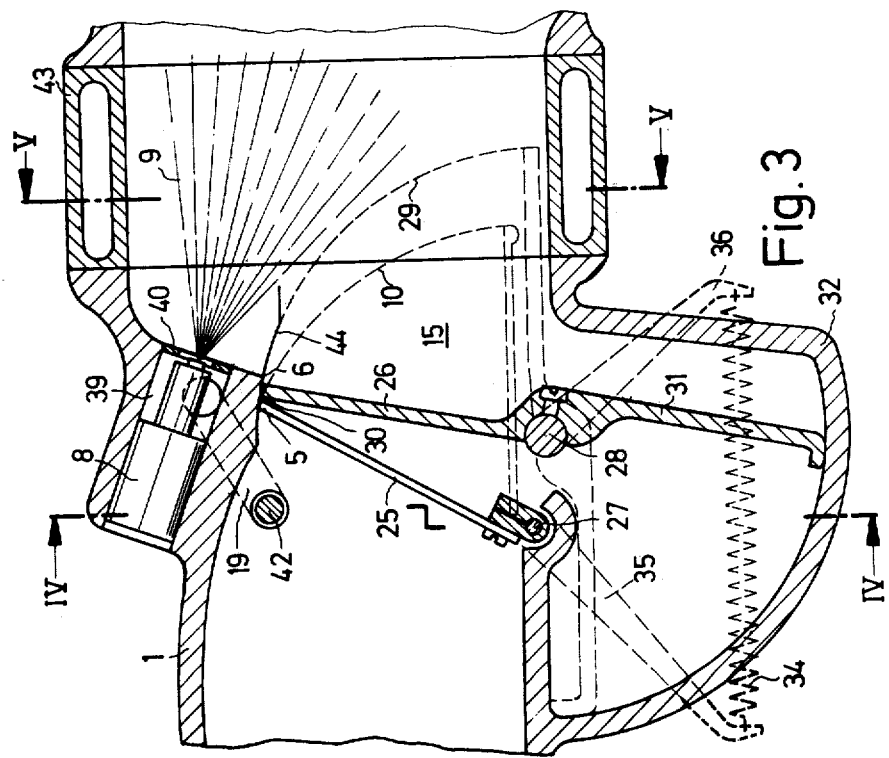

FUEL INJECTION SYSTEM

BACKGROUND OF THE INVENTION

This invention relates to a fuel injection system for externally ignited internal combustion engines which preferably have one fuel injection located in the air induction tube (manifold) of an internal combustion engine. The invention relates, more particularly, to a fuel injection system for externally ignited internal combustion engines having preferably one injection location in the air induction tube (manifold). The metering of the fuel occurs independently of the conditions of the air prevailing immediately at the injection location.

In known fuel injection systems of the type with which the present invention is concerned, the preparation of the fuel-air mixture in the induction tube is satisfactory only within a certain, limited rpm or load range. Only in these ranges, in which there occurs an intensive admixture of air and fuel and where the fuel is very finely atomized by the admitted air, is a substantially homogeneous mixture guaranteed for all engine cylinders. In the other ranges, however, the engine cylinders receive a mixture which is either too rich or too lean. This has the effect of rough running or results in a particularly high concentration of toxic and undesirable components in the exhaust gas. The known technique for solving this problem is to inject the fuel separately in several locations which are disposed in the vicinity of the injection valves. Aside from the fact that, in spite of a satisfactory metering of fuel quantity for the air quantity, there is not sufficient volume within the induction tube for assuring a good admixture. Moreover, fuel injection systems using this known technique are expensive.

SUMMARY OF THE INVENTION

It is an object of the present invention to provide a fuel injection system of the above-described type which achieves the satisfactory preparation of the fuel-air mixture throughout all operating rpm and load ranges, even though fuel injection takes place only at one single location within the induction tube.

The foregoing object, as well as others which are to be made clear from the text below, is achieved in accordance with the present invention in a fuel injection system for externally ignited internal combustion engines having at least one fuel injection location in an air induction tube having a junction leading to individual cylinders, and means for metering of fuel which is independent of air conditions prevailing immediately adjacent to the injection location. A means is provided within the induction tube for bringing air to a high velocity and impinging it at this velocity immediately on injected fuel, enveloping the same. The fuel injection location is disposed ahead of the junction of the air injection tube leading to the individual engine cylinders, as seen in the flow direction. As a result, the air-fuel mixture preparation is effected without wetting of the induction tube inner wall and the means which brings the air to a high velocity.

It is a salient characteristic of the invention that the fuel injection location is disposed, as seen in the direction of flow, ahead of the branching junction of the induction tube leading to the individual engine cylinders and that a mechanism, within the induction tube, accelerates the intake air to a high velocity and that the air impinges on the injected fuel at this high velocity. The fuel-air mixture preparation does not effect a wetting of the mechanism or of the inner wall of the induction tube. In the system described here, the advantages of a divided injection are fully retained, namely the exact metering of the fuel quantities to the individual engine cylinders because the air quantity, which is determined by the engine suction, and which is divided among the engine cylinders, is able to perform a corresponding distribution of the fuel because of the good mixing with all of the delivered fuel. Thus, it is possible to achieve a substantially uniform quality of the mixture over all operating load and rpm ranges. For example, in very precise adaptation processes which are required by rules affecting the exhaust gas constituents, during rapid load changes and during extreme changes of the boundary conditions imposed by the internal combustion engine. In contrast to known fuel supply systems, for example carburetors, it is intended that no wetting of the induction tube inner wall and of members within the tube should occur. Such prior art systems, which operate on the principle of preparing the fuel at a wall or surfaces lead to irregularities in the preparation because additional time is required to release the fuel from the wall or surfaces. This non-uniform wetting of the induction tube, which is virtually uncontrollable because the fuel travels along the induction tube wall according to laws of nature which cannot be changed. Thus, the law of gravity results in a correspondingly non-homogeneous fuel-air mixture which has all the above-mentioned disadvantages. Furthermore, it may be required, at some time in the future or in some cases, to heat the induction tube, condensations then leading to coking or carbonization of the inner wall of the induction tube.

In a preferred embodiment the means for bringing the air to a high velocity is an air guiding flap pivotally mounted on one side within the induction tube and, as seen in the flow direction, ahead of the fuel injection location. The flap controls the effective cross-section of the induction tube, with respect to the injection location. The pivotal radius for the flap is such that an edge of the flap nearly touches a cone defined by the fuel being injected. The position of the flap, at any time, corresponds to the air quantity which is either determined by a throttle valve or by aspiration of the engine or both.

What is important is that this controlled, narrowest cross-section of the induction tube in which the highest air velocity prevails is brought as close to the cone defined by the fuel being injected as possible. Since the air quantity corresponds to the fuel quantity to be injected, the cross-section increases with the air quantity; thus, a longer section of the injection cone, which then carries correspondingly more fuel, is hit by the air at high velocity.

In a fuel injection system according to the present invention, a constant pressure gradient prevails along the air guiding flap, at least during idling operation.

In a fuel injection system according to the present invention, a fuel quantity corresponding to the air quantity flowing through the induction tube is continually metered out to the air.

In a fuel injection system according to an embodiment of the present invention, the task of the air guiding is performed, at least in part, by a conventional throttle valve, whose pivotal axis divides the surface actuated by the air into two wings whose effective surfaces are equal, for the purpose of substantial torque equalization, and whose one side, the front side, may be actuated by the pressure prevailing ahead of the throttle valve and whose other side, the back side, may be actuated by the pressure prevailing behind the throttle valve. The wing of the throttle valve, which serves to guide the air, serves for the essential throttling of the air, whereas its second wing is pivoted, with as little edge clearance as possible, in a bulge defined by the induction tube for the purpose of torque equalization.

In a fuel injection system according to an embodiment of the present invention, the means for bringing air to a high velocity and impinging it is a header flap, which is pivotable about an axis disposed at the edge of the induction tube, and means for providing a preferably constant restoring force against which the flap acts. The restoring force is preferably provided by a co-axial spiral spring. The header flap preferably, simultaneously serves as the air measuring member, its angle of rotation being a control parameter for the metered out fuel quantity.

Advantageously, only parts are used which would be required in any case for the air conduit.

In a preferred embodiment of the present invention, the throttle valve and the header flap cooperate for guiding the air. When both rotate in the same direction, the header flap is disposed ahead of and as near as possible to the throttle valve, as viewed in the direction of air flow. The throttle valve and the header flap preferably have a common pivotal axis.

The cooperation of the header flap and throttle valve guarantees that even during acceleration or increasing load conditions, such as encountered during climbing, of the vehicle, i.e., with a fully opened throttle valve and a relatively low degree of air aspiration by the engine, the header flap, which in accordance with the small amount of aspirated air provides increased throttling in the induction tube, directs the air in the desired manner and at high velocity into the fuel stream. Furthermore, the throttle butterfly valve serves to de-couple the header flap, with respect to air fluctuations, this being especially important if the header flap is simultaneously used as the air measuring member.

BRIEF DESCRIPTION OF THE DRAWING

Embodiments and suitable further developments of the invention are described below and are represented in the drawing.

FIGS. 3, 4 and 5 are respective sectional views of a second exemplary embodiment of an improved fuel system according to the present invention.

DETAILED DESCRIPTION OF THE EXEMPLARY EMBODIMENTS

Figure 1:
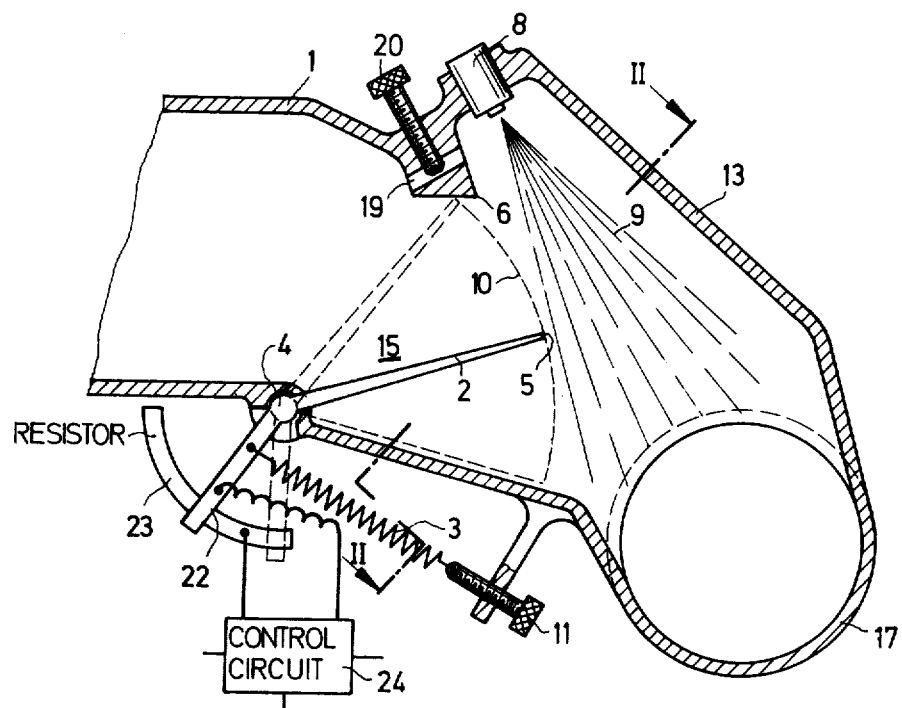
FIGS. 1 and 2 are diagrammatic, partially sectional views of a first, exemplary embodiment of an improved fuel system according to the present invention.

As illustrated in FIG. 1, an embodiment of a fuel injection system includes an induction tube sector 1 within which an air guiding flap 2 is positioned. The flap 2 is pivotable about an axis 4 and against a restoring force provided by a spring 3 or the like. The flap 2 is displaced by the air quantity flowing through the induction tube sector 1 in the direction of air flow, that is toward the right as viewed in FIG. 1. An edge 5 of the flap 2 and an opposing edge 6 of the induction tube sector 1 form a sort of nozzle whose cross-sectioned area depends on the degree of deflection of the flap 2, i.e., on the air quantity and also on the contour of the edge 5 or, for small quantities of air, on the contour of the edge 6. Preferably, the flap 2 is provided with a rectangular surface which is pivotable in a correspondingly rectangular cross-section of the induction tube. The control cross-sectional area forms a sort of nozzle through which air is directed and because of which the air acquires a high velocity. So as not to unfavorably influence the degree of charging of the engine, the pressure gradient within the induction tube due to this flap 2 is kept as small as possible. Another effect of the edges 5 and 6 is a perturbation of the air streamline and hence a formation of a vortex or turbulent condition of flow.

Immediately behind the flap 2, on the side which lies opposite its pivotal axis 4, there is disposed a conventional fuel injection nozzle 8 intended especially for continuous but also for intermittent injection of fuel. The fuel is injected into the induction tube at a certain angle so that the air flow hits an injection conical surface 9 defined by the fuel being injected and envelops it at the same time. The pivotal arc 10 defined by the moving edge 5 of the flap 2, however, terminates shortly ahead of this conical surface 9 in order to prevent fuel from directly striking the flap 2 when it is wide open. In general, the injection nozzle 8 is so disposed and the injection conical surface 9 so chosen that no part of the induction tube walls or other control members in the induction tube are struck by fuel.

The result of having the flap 2 is that, depending on the injected fuel quantity which exactly corresponds to the flowing air quantity, the resulting fuel conical surface 9, whose size varies, is partially circumvented by the air but is substantially penetrated by it. The larger the quantity of injected fuel, the larger is the fuel cone circumvented and penetrated by air because, depending on the flowing air quantity, the flap 2 exposes a larger conical region to the air flow. In any case, however, immediately ahead of the fuel cone the air has the high velocity and contains the vortices or turbulences caused by the cooperating edges 5 and 6 and this leads to an excellent preparation of the fuel-air mixture without the necessity, for example, of releasing condensed fuel from the walls of the induction tube. By changing the restoring force provided by the spring 3 which engages the flap 2, for example by moving a screw 11, it is possible to adjust the charging loss of the engine, or the air velocity prevailing at the control cross-sectional area between the edges 5 and 6.

Figure 2:
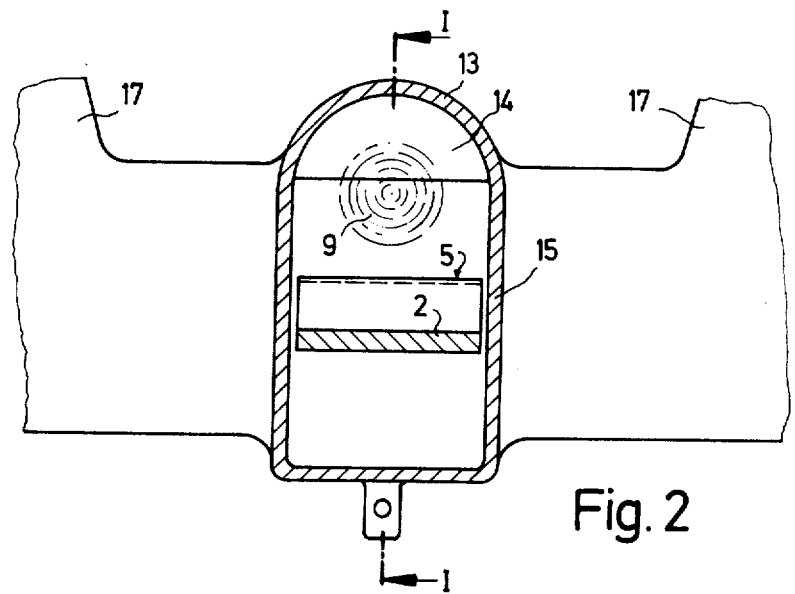

In order to attain good flow guidance for the air, wall 13 of the induction tube is substantially parallel to the fuel injection conical surface 9 in the vicinity thereof, so that, as may be seen in FIG. 2, a rectangular portion 15 of the induction tube section 1 containing the flap 2 into this annular space 14, providing good envelopment of the injection conical surface 9. Immediately adjacent to the induction tube section 1, with the rectangular portion 15 and a portion defined in part by the wall 13 in between, is a section 17 which distributes the fuel-air mixture to be individual engine cylinders. Because of this immediate, close connection, a de-mixing of air and fuel is especially prevented.

Even during idling, when the flap 2 is substantially closed, and the nozzle opening defined by the edges 5 and 6 is more or less a narrow slit, a good fuel-air preparation may still be achieved because there is provided an idling bore 19 whose cross-sectional area may be changed by an adjacent screw 20. The bore 19 guides air in a jet into a small, narrow injection portion of the fuel injection cone during idling operation.

As is shown in FIG. 1, the air guiding flap 2 whose position is, of course, a measure of the air quantity flowing through the induction tube section 1, may be coupled to the wiper 22, as shown, of a variable wire wound resistor 23 so as to develop an electric signal or parameter corresponding to the air quantity which may be used by an electric control circuit 24 for the purpose of metering out a fuel quantity corresponding to the air quantity, in known manner. Of course, a mechanical measurement of the actual air flow value may take the place of an electric one.

Figure 5:
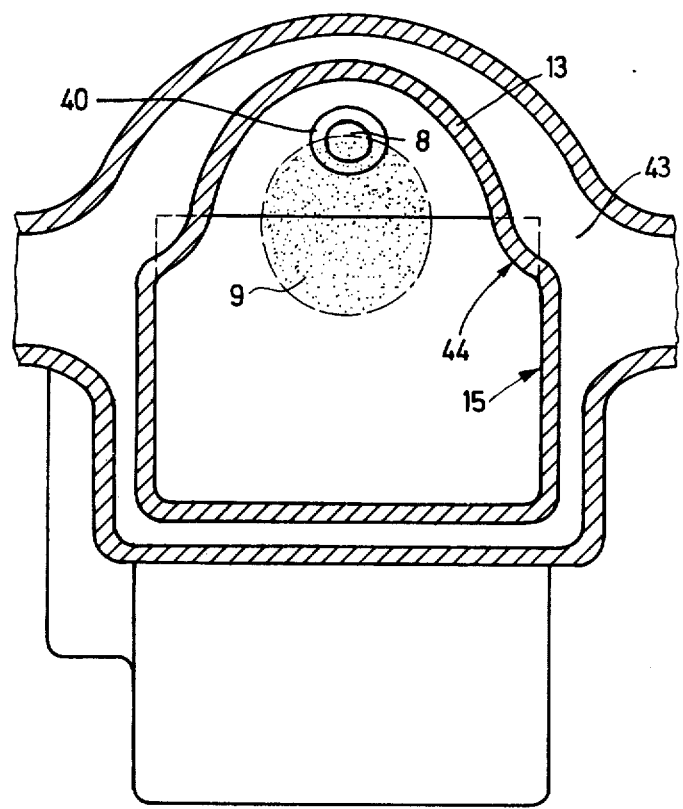

The exemplary embodiment illustrated in FIGS. 3, 4 and 5 includes a throttle valve 26 located in the air preparation section 1 of the induction tube, in addition to an air-directing flap 25, which corresponds to the flap 2 (FIGS. 1, 2). Such a throttle valve 26 is required in virtually all injection systems. Since it is desired that neither the wall of the induction tube nor any control members or valves within the induction tube are to be wetted by fuel, both the flap 25 and the throttle valve 26 are disposed ahead of the fuel injection location, as seen in the direction of air flow.

On the other hand, for the purpose of de-coupling air fluctuations, it is advantageous if the throttle valve 26 is disposed behind (upstream) the air guiding flap 25 as seen in the air flow direction. Thus, in order to obtain good air guidance, i.e., in order to move the pivotal radius of the air guiding flap 25 as close to the fuel injection conical surface 9 as possible, parallel bearings 27 and 28 of the flap 25 and the throttle valve 26 must be as close to one another as possible. In the range of lower load, the close sequential disposition of the air guiding flap 25 and throttle valve 26 has the result that an arc 29 defined by the moving free edge of the throttle valve 26 is slightly forward of an arc 10 defined by the moving free edge 5 of the air guiding flap 25. The edge 5 may contact the upstream surface of the throttle valve 26 and glide along as it moves. In order to dampen impact and also to make any gliding as frictionless as possible, the upper edge portion of the flap 25 facing the throttle valve 26 is provided with a plastic strip 30. In order to achieve the above referred to close disposition of the pivotal radius which defines the arc 10 to the injection fuel conical surface 9, both the pivotal axes 27 and 28 are at approximately the same distance from the axis of the induction tube.

As may be seen from FIG. 3, the pivotal radius which defines the arc 29 of the throttle valve 26 is somewhat closer to the fuel injection conical surface 9 than is the pivotal radius which defines the arc 10 of the air guiding flap 25. Whenever the air quantity flowing through the induction tube, i.e., the rpm, corresponds to the load (throttle valve position) then, generally, the air guiding flap 25 contacts the throttle valve 26 with its plastic strip 30. However, as soon, for example during hill climbing operation, the throttle valve 26 is in its full-load position, but the engine has not yet attained the corresponding rpm (maximum rpm) then the air guiding flap 25 assumes a position which corresponds to the aspirated air quantity (rpm). Conversely, when the throttle valve 26 is virtually closed, the air guiding flap 25 is necessarily carried along. Thus, when the air guiding flap 25 is also the air measuring member, this leads to a fast-acting control result, i.e., throttling of the amount of fuel. In order to equalize the torques on the throttle valve 26 when it is installed in this manner, it is made with two wings, where one wing 31, which is not directly exposed to the air stream dips into a bulge 32 provided in the induction tube. The torque equalization is achieved in that one side of both wings is actuated by the air pressure prevailing ahead of the throttle valve 26 and the other side of both wings is actuated by the air pressure prevailing behind the throttle valve 26. The wing member 31 is recessed in the form of a step, in order to prevent that the bearing location of the axis 27 could impede a full excursion of the throttle valve 26.

As may be seen in FIG. 4, the restoring force for the air guiding flap 25 is a spiral spring 33 shown in cross-section. If a helical spring is used as a restoring spring, then the restoring force may be made substantially constant in that, as shown in FIG. 3, a spring 34 is disposed between two levers 35 and 36 which are themselves fixedly attached to the pivotal axis 27 and 28. Since, in most cases, the angle of rotation of the throttle valve 26 is equal to that of the air guiding flap 25, the tension of the spring 34 is also approximately the same. FIG. 4 shows a lever 37 which permits the arbitrary rotation about the axis 28 and hence also of the throttle valve 26.

Surrounding a region of the injection valve 8 is an annular space 39 which communicates, via an aperture 40, with the induction tube. This produces a certain damming of the idling air quantity and thus produces a favorable fuel-air mixture preparation. Fluid is injected through the aperture 40 and, preferably, the apex of the injection conical surface 9 lies in the plane of the aperture 40. An idling channel 19 terminates in the annular air space 39. As shown in FIG. 4, the first section 41 of the idling channel 19 contains heating plug 42, which may be an incandescent lamp, glow lamp or the like, which is mounted parallel to the axes of rotation of the flap 25 and the throttle valve 26 and ahead of the air control slit which opens first and is formed between the edges 5 and 6, as in the embodiment of FIGS. 1-2. This heating plug 42 can produce a heating of the air which is important and significant when the engine is cold or when the outside temperatures are low, especially at low rpm (idling operation), in order to achieve a smooth running of the engine as well as exhaust gases free of toxic components. The length with which the effective heating surface of the heating plug 42 extends into the bore 41 depends on the required heating power during idling operation.

An additional preparation of the fuel-air mixture can be achieved by a heating chamber 43, which is disposed in the induction air tube downstream of the air guiding flap 25 and through which, preferably, hot exhaust gases are caused to flow.

The relationship between the rotational angle of the throttle valve 26 and the increase of its opening cross-section is not linear, i.e., at the beginning of the displacement of the throttle valve 26 from its closed initial position, a greater cross-section is opened per unit angle than is the case at a larger opening angle. In all customary known throttle valves, the result of that fact is that the suddenly released air quantity is not well able to accept the fuel and this disturbs the running conditions. In other words, the cross-sectional area of the induction tube is opened too quickly by the throttle valve at the outset. It is known, for this reason, to control the opening of a so-called pocket in the induction tube whose cross-sectional area increases in the flow direction. If the throttle valve 26 is appropriately located, as illustrated in FIGS. 3 and 5, a somewhat smaller cross-sectional area is opened at the beginning and subsequently at greater angles the cross-sectional area opens up approximately uniformly with the rotational angle. In the subject invention, this purpose is served by the wall 13 which is adapted, in its shape, to the injection fuel conical surface 9, as shown in FIG. 5, and thus combines the desired relationship with the advantages of the favorable preparation according to the invention. The transition edge between the flap limiting wall 15 of the induction tube which limits the throttle valve 26 and the wall 13 is designated with the numeral 44, in FIG. 3, and characterizes the increase of the controlled air cross-sectional area.

Figure 6:
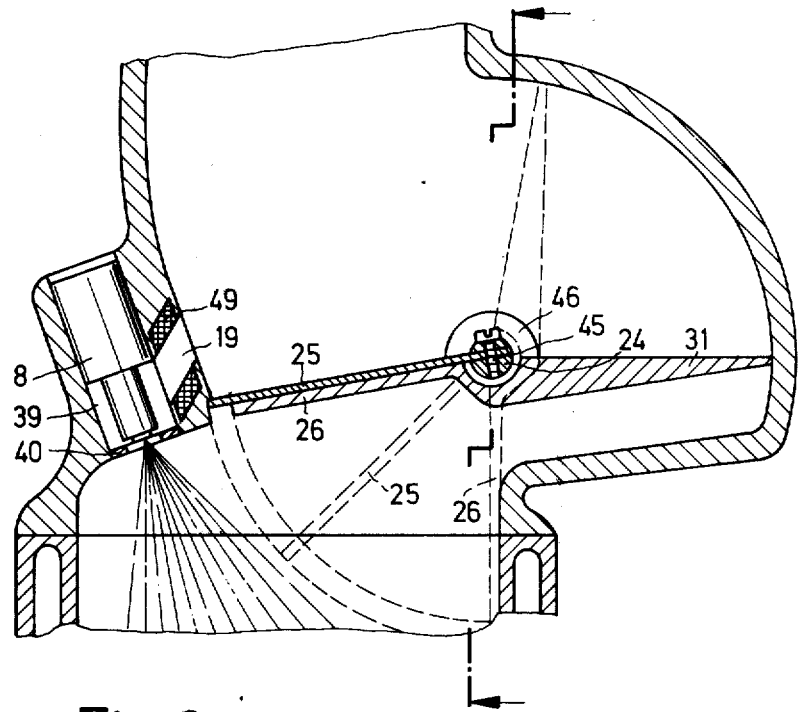
FIGS. 6 and 7 are respective sectional views of a variant of the second exemplary embodiment shown in FIGS. 3–5.
Figure 7:
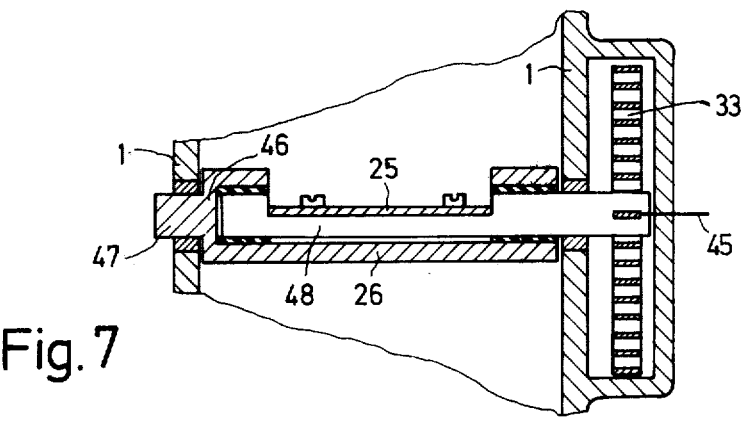

It has been declared above to be desirable to locate the pivotal axes of the air guiding flap 25 and of the throttle valve 26 as close to one another as possible. This is accomplished in the embodiment shown in FIGS. 6 and 7 by providing a common pivotal axis 45. The throttle valve 26 is fastened on a hub-shaped member 46 which extends out of the induction tube sector 1 at a location 47 and may be operated by a device, not further shown, connected to the gas pedal. Inserted into this hub-shaped member 46 is a shaft 48 to which is fastened the air guiding flap 25 and, outside of the induction tube sector 1, a spiral spring 33 provides the restoring force. Thus, within a certain rotational range, the guiding flap 25 and the throttle valve 26 may be rotated with respect to one another. Thus, as has been described above, even if the throttle valve 26 is full open during climbing operation (see broken line position), the air guiding flap 25 may assume a position corresponding to the air quantity aspirated by the engine, i.e., some intermediate position.

A heating winding 49 may be provided to heat the idling air so as to attain a good mixture preparation.

It is to be appreciated that the foregoing description and accompanying drawings, which relate to exemplary embodiments of a fuel system according to the present invention, are provided by way of example, not by way of limitation. It is to be appreciated that numerous other embodiments and variants are possible within the spirit and scope of the invention, the scope being defined by the appended claims.

What is claimed is:

1. In a fuel injection system for externally ignited internal combustion engines having at least one fuel injection location in an air induction tube having a junction leading to individual cylinders, and means for metering of fuel which is independent of air conditions prevail prevailing immediately adjacent to the injection location, the improvement comprising air flow control means mounted within said induction tube and comprising an air guiding flap pivotably mounted on one side within said induction tube and, as seen in the flow direction, ahead of said injection location, said flap defining an air nozzle with a portion of the wall of said induction tube near said injection location for controlling the effective cross-sectional area of said induction tube with respect to said injection location, said nozzle serving to bring air to a high velocity, said fuel injection location including a fuel injection nozzle being disposed ahead of said junction of said air induction tube leading to the individual engine cylinders as seen in the flow direction and downstream of said air nozzle for injecting fuel toward said junction, whereby the air guiding flap defines a pivotal arc with its free end nearly touching the surface of a cone defined by the injected fuel, the high velocity air impinges immediately or injected fuel, enveloping the same, and the air-fuel mixture preparation is effected without wetting of the induction tube inner wall and the means for bringing the air to a high velocity.

2. An improved fuel injection system according to claim 1, further including a throttle valve, the position of which determines a limit position of said flap.

3. An improved fuel injection system according to claim 1, wherein the position of said flap is at least partially determined by air being aspirated.

4. An improved fuel injection system according to claim 1, including means for providing a constant pressure gradient at the air guiding flap, at least during idling operation.

5. An improved fuel injection system according to claim 1, including means for continually metering out into said induction tube a fuel quantity corresponding to air quantity flowing through said induction tube.

6. An improved fuel injection system according to claim 1, including a throttle valve within said induction tube and whose pivotal axis divides its surface actuated by the air into two wings whose effective surfaces are substantially equal, for the purpose of substantial torque equalization, and whose one side may be actuated by the pressure prevailing ahead of said throttle valve and whose other side may be actuated by the pressure prevailing behind said throttle valve, one of said wings which serves to guide the air is essential for throttling the air, whereas the other of said wings is pivoted, with as little edge clearance as possible, in a bulge of said induction tube for the purpose of torque equalization.

7. An improved fuel injection system according to claim 1, wherein said air flow control means further comprises means for providing a restoring force against which said flap acts.

8. An improved fuel injection system according to claim 7, wherein said guide flap simultaneously serves as an air measuring member, its angle of rotation being a control parameter for determining metered out fuel quantity.

9. An improved fuel injection system according to claim 8, wherein said means providing a restoring force is a co-axial spiral spring.

10. An improved fuel injection system according to claim 1, wherein said means for bringing air to a high velocity comprises an air guiding flap of rectangular shape, and a cross-section of said induction tube, in the vicinity of said air guiding flap, is correspondingly rectangular.

11. An improved fuel injection system according to claim 1, wherein said means for bringing air to a high velocity includes a throttle valve and the header flap, which cooperate for guiding the air, both said flap and said valve being mounted to rotate in the same direction, said header flap being disposed ahead of, near to said throttle valve, as seen in the direction of flow, and co-axially thereto.

12. In a fuel injection system for externally ignited internal combustion engines having at least one fuel injectionlocation in an air induction tube having a junction leading to individual cylinders, and means for metering of fuel which is independent of air conditions prevailing immediately adjacent to the injection location, the improvement comprising means within said induction tube for bringing air to a high velocity and impinging it at this velocity immediately on injected fuel, enveloping the same, said fuel injection location being disposed ahead of said junction of said air induction tube leading to the individual engine cylinders as seen in the flow direction, whereby the air-fuel mixture preparation is effected without wetting of the induction tube inner wall and the means for bringing the air to a high velocity, wherein:
  i. said means for bringing air to a high velocity includes a trhottle valve and the header flap, which cooperate for guiding the air, both said flap and said valve being mounted to rotate in the same direction, said header flap being disposed ahead of, near to said throttle valve, as seen in the direction of flow, and co-axially thereto; and
  ii. said throttle valve and said header flap have a common pivotal axis.

13. An-improved fuel injection system according to claim 12, including a first shaft on which said header flap is carried, and a hub-shaped further shaft on which said valve is carried, said first shaft being positioned within said further shaft, said hub-shaped further shaft having a recess for fastening and allowing relative motion of said header flap, independent access being possible to said shafts from opposite sides of said induction tube.

14. An improved fuel injection system according to claim 12, including a spring and wherein restoring force for said header flap is provided by said spring whose point of attack faces away from said flap and is changeable together with a throttle valve adjustment means.

15. An improved fuel injection system according to claim 12, wherein an edge of said header flap is provided with a strip of plastic or the like which may glide on one side of said throttle valve facing it.

16. An improved fuel injection system according to claim 1, wherein said injection location is located in a pocket which is open toward that portion of said induction tube in which said means for bringing air to a high velocity is located, and which is part of said induction tube and into which air is guided and whose wall extends substantially parallel to a conical surface defined by said fuel being injected.

17. An improved fuel injection system according to claim 16, wherein said means for bringing air to a high velocity includes a flap having a rectangular sector in its pivotal extent and intersects a wall region surrounding said conical surface so that all air is immediately carried into and around the fuel being injected.

18. An improved fuel injection system according to claim 17, including a throttle valve, changes of effective cross-sectional area of said induction tube due to said throttle valve and angular rotational changes thereof being substantially linear in low load range.

19. An improved fuel injection system according to claim 18, wherein said pocket has a wall on that side carrying said injection location, said wall, together with that sector of said induction tube controlled by said flap, forming a perturbing edge which defines a sudden cross-sectional area change immediately prior to the region in which air impinges onto the fuel.

20. An improved fuel injection system according to claim 1, wherein said means for bringing air to a high velocity comprises a flap which is bypassed by an idling air channel.

21. An improved fuel injection system according to claim 20, including means for varying the cross-sectional area of said idling air channel.

22. An improved fuel injection system according to claim 1, including a fuel injection nozzle at said location, said nozzle being surrounded by an air space and flowing air for the purpose of preparing said mixture.

23. An improved fuel injection system according to claim 22, including means for surrounding said nozzle with idling air.

24. An improved fuel injection system according to claim 23 wherein said air space surrounding said nozzle is throttled in the direction of said induction tube for creating a pressure head.

25. An improved fuel injection system according to claim 24, including means for heating the idling air, said means for heating being positioned in the vicinity of an idling air channel.

26. An improved fuel injection system according to claim 25, wherein said means for bringing air to a high velocity comprise an air guiding flap, and wherein, ahead of said air guiding flap, as seen in the direction of flow, and parallel with respect to the axis of rotation of said flap and ahead of a first-opening control slit of said flap, there is disposed a glow plug for heating air flowing through said idling air channel when said flap is closed.

27. An improved fuel injection system according to claim 1, including means for heating that portion of said induction tube into which fuel is injected.

28. An improved fuel injection system according to claim 27 wherein said means means for comprises means using hot exhaust gases.

29. In a fuel injection system for externally ignited internal combustion engines having at least one fuel injection location in an air induction tube having a junction leading to individual cylinders, and means for metering of fuel which is independent of air conditions prevailing immediately adjacent to the injection location, the improvement comprising: means within said induction tube for bringing air to a high velocity and impinging it at this velocity immediately on injected fuel, enveloping the same, said fuel injection location being disposed ahead of said junction of said air induction tube leading to the individual engine cylinders as seen in the flow direction, whereby the air-fuel mixture preparation is effected without wetting of the induction tube inner wall and the means for bringing the air to a high velocity; a fuel injection nozzle at said location, said nozzle being surrounded by an air space and flowing air for the purpose of preparing said mixture; means for surrounding said nozzle with idling air; and means for heating the idling air, said means for heating being positioned in the vicinity of an idling air channel; wherein:
  i. said air space surrounding said nozzle is throttled in the direction of said induction tube for creating a pressure head;
  ii. said means for bringing air to a high velocity comprise an air guiding flap, and ahead of said air guiding flap, as seen in the direction of flow, and parallel with respect to the axis of rotation of said flap and ahead of a first-opening control slit of said flap, there is disposed a glow plug for heating air flowing through said idling air channel when said flap is closed; and
  iii. one end of said glow plug is disposed at the beginning of said idling channel, in the opening bore, so that the idling air moves along at least one part of said glow plug, and where it is possible to adjust the length of the heated portion to the quantity of idling air.

* * * * *